United States Patent [19]

Stedefeder et al.

[11] 4,086,413
[45] Apr. 25, 1978

[54] PURIFICATION OF COPOLYMERS CONTAINING CROTONIC ACID

[75] Inventors: Joachim Stedefeder, Lampertheim; Ingo H. Dorn, Dannstadt-Schauernheim; Horst Kuhn, Otterstadt; Walter Kastenhuber, Hoeningen; Wolfgang Linke, Ludwigshafen, all of Germany

[73] Assignee: BASF Aktiengesellschaft, Ludwigshafen, Germany

[21] Appl. No.: 792,729

[22] Filed: May 2, 1977

[30] Foreign Application Priority Data

May 20, 1976 Germany .............................. 2622463

[51] Int. Cl.² ............................................. C08J 11/00

[52] U.S. Cl. ..............................528/499; 260/29.6 PT; 526/53

[58] Field of Search ........................ 528/499; 526/53; 260/29.6 PT

[56] References Cited

U.S. PATENT DOCUMENTS

| | | | |
|---|---|---|---|
| 3,169,950 | 2/1965 | Etter, Jr. et al. ..................... | 528/499 |
| 3,373,145 | 3/1968 | Wagner ................................. | 528/499 |

*Primary Examiner*—Eugene C. Rzucidlo
*Attorney, Agent, or Firm*—Keil, Thompson & Shurtleff

[57] ABSTRACT

Copolymers of crotonic acid are purified, to remove monomeric crotonic acid, by extracting the copolymers with water at from 50° to 120° C and stirring the system, the flow energy of the water and the energy of stirring being chosen so that the polymer particles just remain suspended.

2 Claims, No Drawings

PURIFICATION OF COPOLYMERS CONTAINING CROTONIC ACID

The present invention relates to the purification of copolymers containing crotonic acid, particularly copolymers with vinyl acetate, propionate and butyrate and allyl acetate, propionate and butyrate, but also copolymers with vinyl esters and allyl esters of branched carboxylic acids of 8 to 12 carbon atoms, and to copolymers with esters of acrylic acid or methacrylic acid. These copolymers in most cases contain from 5 to 15% by weight of crotonic acid and are all in the main the base material for hair toiletries. In order to form an elastic film, such materials must have a relatively low glass transition temperature; above all, however, they must be odorless, ie. free from residual monomers having an unpleasant odor. Since crotonic acid has an extremely penetrating inherent odor, which remains perceptible even at the highest dilutions, the purification of copolymers which contain crotonic acid as copolymerised units presents a particularly great problem.

The literature contains numerous examples of the manufacture and use of such copolymers, but these publications do not specify special methods of purification. According to these publications, eg. Swiss Pat. No. 535,798 and Austrian Pat. Nos. 293,723 and 292,301, the finished polymer is simply filtered off after polymerization or after precipitation of the polymer, and is washed with water. Another frequently used method was to carry out the polymerization as a suspension polymerization, to pass an inert gas through the aqueous suspension, or strip the suspension, after completion of the reaction, then to filter the suspension and thereafter to wash the filter residue with water. However, all these methods failed to prove completely satisfactory, and there always remained a residual odor; it is true that this was frequently compensated by adding a perfume oil, but nevertheless the presence of residual crotonic acid presented hazards since crotonic acid is extremely toxic. It is true that the copolymers are used in a neutralized form, as salts of certain alkanolamines, but, for example because of the $CO_2$ content of the atmosphere, even the neutralized copolymers are never odorless.

As a result of the low glass transition temperature, purification by stripping or passing a gas, as described above, presents the additional problem that the suspended particles become tacky at elevated temperature and therefore can agglomerate, which naturally interferes with the process of purification by means of water on the filter, because of the smaller surface area of the filter residue.

It is an object of the present invention to provide a method of purification to free copolymers, containing crotonic acid, from odor and hence substantially to free them from crotonic acid and other odorous materials.

We have found that this object is achieved, according to the invention, by an extraction with fully desalinated water, carried out at an elevated temperature, whilst stirring.

The process for purifying copolymers, containing crotonic acid as copolymerized monomer units, to remove unconverted monomeric crotonic acid and concomitant odorous materials, the copolymers being in the form of particles suspended in water and having a glass transition temperature of $<30°$ C when saturated with water, by treating the copolymers with water, is carried out, according to the invention, by a method in which the polymers are extracted with fully desalinated water at from 50° to 120° C and from 1 to 4 bars, the extraction being carried out in a cylindrical extraction vessel which has a height:diameter ratio of $>1$, the water of extraction is introduced at the bottom and removed at the top and the system is stirred, the ratio of the flow energy to the energy of stirring being from 1:4 to 4:1 and the total energy acting on the system being such that the particles just remain suspended.

Using this method of purification it is now possible to obtain a completely odorless crotonic acid copolymer.

The process may be applied to all crotonic acid copolymers which, when saturated with water, have a glass transition temperature of $<30°$ C, preferably $<15°$ C. These are copolymers which contain up to 30% by weight, preferably from 5 to 15% by weight, of crotonic acid and, as additional constituents, one of the following examples of monomers copolymerizable with crotonic acid: vinyl esters and allyl esters of saturated carboxylic acids, eg. vinyl acetate, vinyl propionate or vinyl butyrate, esters of unsaturated carboxylic acids, eg. methyl acrylate or methacrylate, ethyl acrylate or methacrylate, propyl acrylate or methacrylate, butyl acrylate or methacrylate, hydroxyethyl acrylate or methacrylate or hydroxypropyl acrylate or methacrylate, and esters of trihydric and polyhydric alcohols, eg. esters of glycerol with unsaturated carboxylic acids. Binary mixtures of the said comonomers may also be employed, in which case ternary copolymers are produced.

The polymerization reaction is known per se and does not require detailed discussion. Well-defined and therefore advantageous copolymers are obtained, for example, by carrying out the copolymerization as described in German Pat. Nos. 816,760 and 975,239, but (see Austrian Pat. No. 292,301) in the case of a bead polymerization protective colloids are used to stabilize the particles.

For success of the purification operation it is essential that the copolymers should be in a finely divided form in aqueous suspension. In principle, the methods by which such a suspension is produced are immaterial; what matters is that the particles should be sufficiently fine, ie. that their surface area should be very large. The preferred particle size is from 60 to 300 $\mu$m and particle sizes of from 80 to 250 $\mu$m are of particular interest.

As an alternative to suspension polymerization, the monomers may be mass-polymerized and the suspension then produced mechanically. Solution polymerization followed by precipitation of the copolymers is also possible; in that case the polymer powder obtained is again suspended in water.

However, suspension polymerization, in which case the aqueous suspension can be subjected to the purification process immediately after the reaction, proves to be the most suitable. In that case, it is advantageous to remove by steam stripping, prior to the extraction, any residual monomers or secondary products removable by distillation.

The suspension is now extracted with fully desalinated water, preferably at from 80° to 100° C. It is necessary to stir the material vigorously to prevent agglomeration, but in doing so it must be borne in mind that whilst inadequate agitation of the suspension causes such agglomeration, the same effect also results on excessively vigorous agitation, evidently because the high kinetic energy imparted thereby causes the polymer particles to impinge on the wall of the extraction vessel with such force that they adhere thereto and then grow into larger particles.

At the same time, attention must be given to the upward stream of water of extraction, which leaves at the top. This energy must also not be too high, ie. the water must not flow through too rapidly, since otherwise the particles are drawn upward and entrained. Too low an energy, due to too low a water throughput, results in excessively unfavorable extraction conditions; furthermore, if the energy of stirring was too low, the particles would not remain in suspension and their agglomeration would be favored. According to the invention, the flow energy and the energy of stirring must be so chosen as to arrive at a ratio of from 4:1 to 1:4, preferably from 2:1 to 1:2. Optimum results are obtained if the throughput of water is from 10 to 40 kg per kg of solid copolymer. The extraction time is inherently immaterial provided the above parameters are observed; the time is decided by the concentration of the suspension, the degree of contamination of the copolymer, the water throughput per kg of copolymer and the energy of stirring matched to these factors, and can be selected to suit the operating details, for example the duration of the polymerization reaction carried out beforehand, by experiments under actual operating conditions. As has been explained, in order to achieve an optimum extraction effect, from the point of view of the time required and the quality of the product obtained, the particles should advantageously have a size of from 60 to 300 $\mu$m, preferably from 80 to 250 $\mu$m. The small particles are at the top of the vessel and the large particles further below. In order to prevent small amounts of the finer particles nevertheless being lost, it is preferred to use a cylindrical vessel in which the top section has a substantially greater diameter than the main section; as a result the energy applied per unit volume of suspension decreases sufficiently in this calming zone to allow the particles to fall back into the narrow part of the cylinder. Even smaller particles, the size of which lies below the preferred ranges, are in general entrained and can, for example, be separated off by means of a hydrocyclone and returned to the fresh extraction water.

The energy required for the desired extraction, which has been discussed and which, as has been stated, just suffices to maintain the polymer particles in suspension can be determined by visual observation (through a sight glass) or by means of turbidity measurements; such methods of monitoring are known to those skilled in the art and do not need to be discussed here.

Ass conventional stirrers may be used; it is advantageous to choose those which exert an action throughout the entire volume of the cylinder, preferably crossbeam stirrers.

The end of the operation can be ascertained by analytically examining the crotonic acid content. In that case, the content of trans-crotonic acid, being the component principally responsible for the odor, serves as a yardstick. However, the method of extraction described removes additional odorous substances at the same time. After the extraction, the particles are isolated, and dried, by conventional methods.

Carrying out the process according to the invention with due attention to the temperature and the energy imparted to the suspension and, preferably, the size of the polymer particles and the water throughput, now makes it possible to produce a completely odorless material.

The method according to the invention produces an unexpected result inasmuch as it had to be assumed that extraction at the stated temperatures, carried out on a material of such low glass transition temperature, would cause agglomeration of the particles and hence give a completely inadequate purification effect.

The Examples which follow illustrate the invention.

EXAMPLE 1

An aqueous suspension of a copolymer of 90% by weight of vinyl acetate and 10% by weight of crotonic acid was stirred, in a vertical cylindrical vessel which had a height/diameter ratio of 2:1 and was provided with a crossbeam stirrer, at a rate which was just sufficient to keep the polymer particles in suspension.

The polymer suspension contains about 50% by weight of polymer mixed with 50% by weight of water, the polymer having been produced by bead polymerization of the monomers (vinyl acetate and crotonic acid) in this water. Following the polymerization, the bulk of the unpolymerized vinyl acetate, as well as acetaldehyde produced by hydrolysis of the vinyl acetate, had been removed by stripping.

The extraction of the components possessing an unpleasant odor — in the main, unpolymerized crotonic acid — was then carried out on the suspension, at 90° C, by introducing fully desalinated water at 90° C at the bottom of the extraction vessel for 10 hours whilst stirring, the total amount of water of extraction being about 15 kg per kg of polymer employed, and the contaminated water being removed at the top. In the course of the extraction, the rate of stirring was monitored continuously in order just to keep the particles in suspension, as before. The degree of odor of the polymer obtained after this extraction is tested by dissolving a sample and spraying the solution. Assessment of the odor by three independent testers shows that the material is virtually completely odorless.

Trace analysis, by gas chromatography, additionally carried out on the beads to measure the content of trans-crotonic acid, being the component principally responsible for the odor, gave a value of 40 ppm.

Polymer beads entrained by the water of extraction during the extraction operation were retained in a settling chamber, of larger cross-section, downstream from the extraction chamber.

The particle size distribution of the polymer was within the range from 60 to 300 $\mu$m.

EXAMPLE 2

The procedure of Example 1 was followed, but a polymer of 85% by weight of vinyl acetate, 5% by weight of hydroxypropyl acrylate and 10% by weight of crotonic acid was used.

The extraction temperature was 80° C.

We claim:

1. A process for purifying copolymers, containing crotonic acid as copolymerized monomer units, to remove unconverted monomeric crotonic acid and concomitant odorous materials, the copolymers being in the form of particles suspended in water and having a glass transition temperature of <30° C when saturated with water, by washing the copolymers with water, wherein the polymers are extracted with fully desalinated water at from 50° to 120° C and from 1 to 4 bars, the extraction being carried out in a cylindrical extraction vessel which has a height/diameter ratio of >1, the water of extraction is introduced at the bottom and removed at the top and the system is stirred, the ratio of the flow energy to the energy of stirring being from 1:4 to 4:1 and the total energy acting on the system being such that the particles just remain suspended.

2. A process as claimed in claim 1, wherein the throughput of water is from 10 to 40 kg per kg of dry polymer.

* * * * *